Nov. 21, 1967  J. MARKHAM  3,353,565

PIPE END INSERT

Filed Sept. 21, 1964

INVENTOR.
Junius Markham
BY
Young and Thompson
ATTYS.

US United States Patent Office 3,353,565
Patented Nov. 21, 1967

3,353,565
PIPE END INSERT
Junius Markham, Tulsa, Okla., assignor to Swel-Plug, Incorporated, Tulsa, Okla., a corporation of Oklahoma
Filed Sept. 21, 1964, Ser. No. 398,007
14 Claims. (Cl. 138—89)

The present invention relates to pipe end inserts, which may be either of the type of pipe joints, or of the type of pipe end closures. In other words, the pipe end inserts of the present invention may interconnect two lengths of pipe so as to provide a continuous conduit for fluid flow therethrough; or they may terminate a length of pipe so as to prevent fluid flow therethrough.

It is an object of the present invention to provide a pipe end insert which is readily insertable in the end of a pipe.

Another object of the present invention is the provision of a pipe end insert actuated into gripping engagement by internal pressure.

Still another object of the present invention is the provision of a pipe end insert having remarkably great holding power against axial displacement once it is installed.

Finally, it is an object of the present invention to provide a pipe end insert which will be relatively simple and inexpensive to manufacture, easy to install, maintain, repair and replace, and rugged and durable in use.

Other objects and advantages of the present invention will become apparent from a consideration of the following description, taken in connection with the accompanying drawing, in which.

Figure 1:
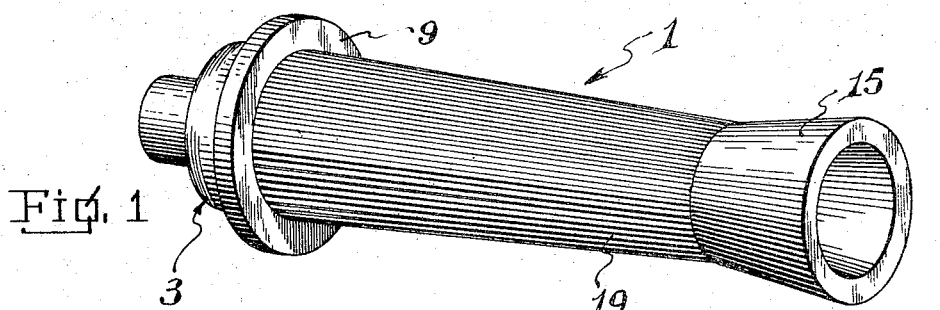
FIGURE 1 is a perspective view of a pipe end insert according to the present invention.
Figure 2:
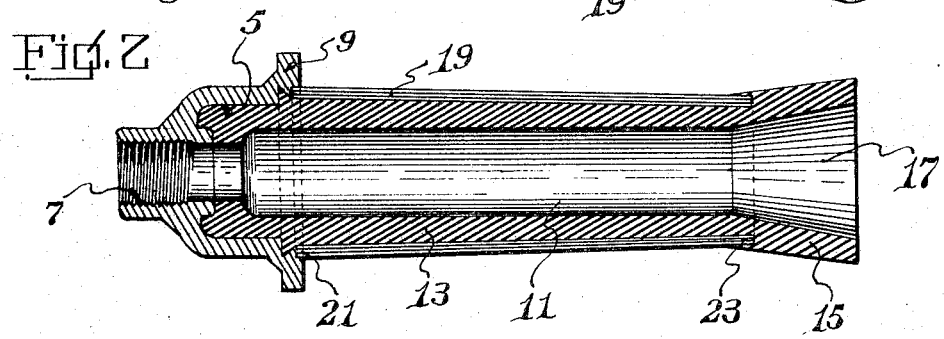
FIGURE 2 is a longitudinal cross-sectional view of a pipe end insert according to the present invention.

Referring now to the drawing in greater detail, there is shown a pipe end insert according to the present invention, indicated generally at 1, and including a rigid metal ring 3 which may, for example, be of steel. Ring 3 is characterized by a central recess 5 open at at least one end thereof, which in the illustrated embodiment is the right hand end in FIG. 2. Also in the illustrated embodiment, ring 3 includes an axially extending internally screw-threaded nipple 7 that in the illustrated embodiment is a reducing nipple. Of course, it could be an enlargement nipple or a nipple for the reception of a screw-threaded pipe end of the same size as insert 1 itself is designed to fit. Alternatively, as was pointed out above, when the pipe end insert of the present invention is adapted for use as a pipe end closure, there will be no nipple 7 and recess 5 will be closed at its side which appears as the left side in FIG. 2.

On its other axial end, ring 3 carries an enlarged integral annular radially extending abutment shoulder 9.

Fixedly secured within recess 5 is one end of a sleeve 11 of an elastic deformable material such as natural or synthetic rubber or other elastomer. Sleeve 11 is shown secured within recess 5 by means of portions of sleeve 11 that fit into annular recesses in sleeve 5. It will be understood, of course, however, that sleeve 11 could be secured within recess 5 by any of the other well known means of securement of elastomeric sleeves within rings.

Sleeve 11 is of uniform configuration and hence has a contour which is a figure of rotation about its axis. Sleeve 11 is characterized by a converging portion 13 which tapers in external diameter but preferably not in internal diameter from a greatest external diameter adjacent ring 3 to a least external diameter most of the way toward the free end of sleeve 11. Converging portion 13 terminates endwise away from ring 3 in a flared portion 15 which has an external diameter and preferably also an internal diameter which increases progressively from the end of converging portion 13 toward the free end of sleeve 11 in the undeformed position of sleeve 11. Sleeve 11 has an axial bore 17 therethrough. When pipe end insert 1 is used as a point between two pipes, then bore 17 communicates with the interior of nipple 7; but when pipe end insert 1 is in the form of a pipe end closure, then bore 17 extends at least most of the length of sleeve 11 and may either terminate in a blind end preferably within ring 3 or may extend all the way through sleeve 11 as in the illustrated embodiment and communicate with the closed end of ring 3.

Sleeve 11 is encompassed by a sheath of ribs 19 which are preferably of resiliently flexible steel. Each rib 19 is in the form of a flat strip which is of a width at least several times greater than its thickness and of a length at least several times greater than its width. Each rib 19 is concave as seen in transverse cross section but longitudinally straight. In other words, all lines extending lengthwise of the surface of a rib 19 are parallel to each other; but at least for the most part, those lines are not coplanar. The concavity of each rib 19 is directed radially inwardly, and the ribs 19 overlie each other in herringbone relationship.

Ribs 19 are fixedly secured at their ends 21 within ring 3 as by welding directly to the metal of ring 3. Ribs 19 extend along the exterior of sleeve 11 lengthwise thereof and in converging relationship along with the converging contour of the exterior of sleeve 11, and terminate in ends 23 remote from ring 3. Ends 23 are preferably embedded in the elastomer of sleeve 11 or flared portion 15, as by molding or the like. Preferably, the edges of ribs 19 that contact sleeve 11 are also embedded a short distance in the material of sleeve 11. In the undeformed position of the insert shown in cross section in FIG. 3, the radially outer edges of the ribs 19 lie one on top of another, but the radially inner edges of ribs 19 are spaced apart from each other. The fixed securement of ends 21 to ring 3 and the embedding of ends 23 in the material of sleeve 11 ensure this latter relationship to the ribs in the undeformed position of FIG. 3. At the same time, ribs 19 are thus mounted for limited transverse sliding movement relative to each other.

Figure 5:
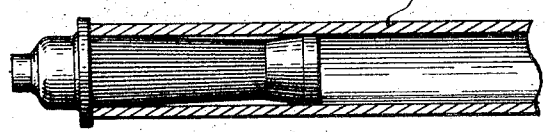
FIGURE 5 is a reduced view showing the first step of installation of a pipe end insert according to the present invention in the end of a pipe of which the wall has been cut away for clarity of illustration.

In use, the pipe end insert of the present invention is inserted in a pipe end 25 in the position shown in FIG. 5. The abutment shoulder 9 serves to limit the depth of insertion of the insert. When insert 1 is to be used as a pipe joint, then a further pipe end 27 of the same or smaller or larger size than pipe end 25 is screw-threadedly secured in nipple 7.

Figure 3:
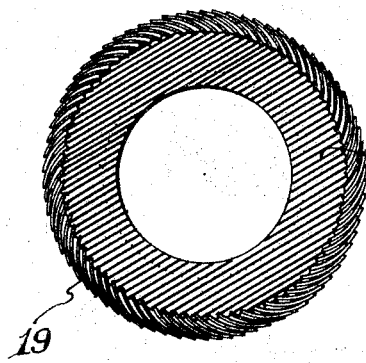
FIGURE 3 is an enlarged transverse cross-sectional view of a pipe end insert of the present invention.
Figure 4:
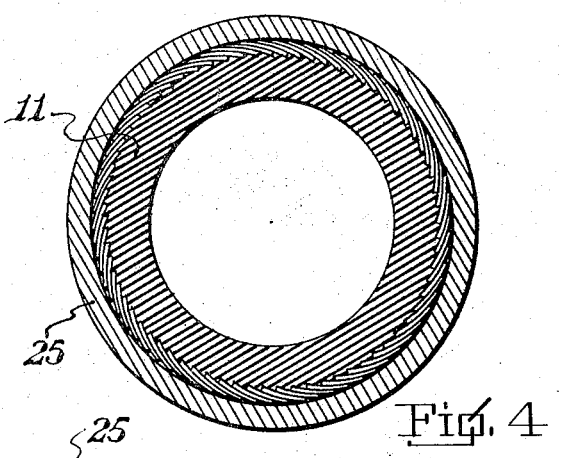
FIGURE 4 is a view similar to FIGURE 3 but showing the insert installed in the end of a length of pipe.
Figure 6:
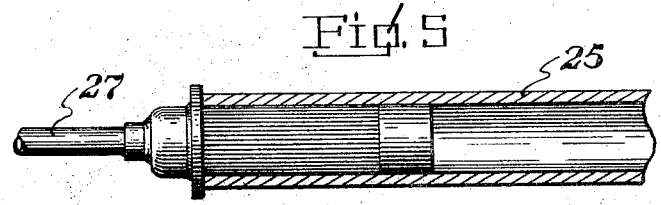
FIGURE 6 is a view similar to FIGURE 5 but showing a pipe end insert according to the present invention in its fully assembled and operative position.

When fluid pressure is applied to the interior of pipe ends 25 and 27, then sleeve 11 is expanded and insert 1 alters its shape from that of FIG. 5 to that of FIG. 6, that is, from that of FIG. 3 to that of FIG. 4. In this altered relationship, the ribs 19 now overlie each other in substantially full contact with each other along their overlying proportions. Also, the radially outer edges of ribs 19 are pressed strongly against the interior of pipe end 25 and ribs 19 are now preferably parallel to the internal wall of pipe end 25. Moreover, what was a flared portion 15 in the undeformed condition of the insert is now a substantially cylindrical portion that seals against the internal wall of pipe end 25 and thus seals off the ribs 19 from the interior of pipe end 25. On the other hand, the withdrawal of the insert endwise from pipe end 25 is prevented by the strong pressure of ribs 19 against the internal wall of pipe end 25 and also by the secure connection between ends 21 of ribs 19 and rigid ring 3.

A pipe end insert is thus provided which, in its undeformed condition, can be quite readily inserted into the end of a pipe, but which in its expanded or internally pressurized position strongly grips the internal wall of the pipe to prevent removal in use.

Of course, when insert 1 is used as a pipe end closure and recess 5 is blind, the operation is the same, because the buildup of pressure in bore 17 expands sleeve 11 the same whether or not recess 5 is blind.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be restored to without departing from the spirit of the invention, as those skilled in this art will readily understand. Such modifications and variations are considered to be within the purview and scope of the present invention as defined by the appended claims.

Having described my invention, I claim:

1. A pipe end insert comprising
  a rigid supporting structure,
  an elongated hollow sleeve of elastic material having a first end secured to said rigid supporting structure and a second end adapted to be inserted into a pipe end, said second end of said sleeve being open for communication with the interior of the pipe so that said sleeve may be radially expanded by pressure in the pipe,
  a flexible elongated radially expansible sheath carried by and surrounding said sleeve throughout at least a major portion of the length thereof, said sheath comprising a multiplicity of relatively straight flexible gripping elements arranged to extend generally longitudinally of said sleeve, said sheath adapted to be forced radially outward by said sleeve into frictional gripping engagement with the inner surface of the pipe upon expansion of said sleeve throughout at least a major portion of the length of said sheath.

2. A pipe end insert as defined in claim 1 wherein the ends of said gripping elements are at one end secured to said rigid supporting member and at the opposite end are secured to said sleeve at a position intermediate the ends thereof.

3. A pipe end insert as defined in claim 1 wherein each of said multiplicity of substantially straight flexible gripping elements has one of its longitudinal edges embedded within and secured to said elastic sleeve.

4. A pipe end insert as defined in claim 3 wherein said multiplicity of relatively straight flexible gripping elements overlie each other.

5. A pipe end insert as defined in claim 4 wherein said multiplicity of relatively straight flexible gripping elements are radially inwardly concave.

6. A pipe end insert as defined in claim 2 wherein a portion of said elastic sleeve extends beyond said sheath in a direction away from said rigid supporting structure and flares axially outwardly to provide an initial seal upon insertion of said second end into a pipe end.

7. A pipe end insert as defined in claim 6 wherein said axially outwardly flared portion of said sleeve has an overall cross-sectional area at least equal to that of the inside of the pipe into which it is to be inserted so as to form when so inserted a sealing lip operative to provide an initial strong fluid-tight seal with the inner surface of the pipe independent of internal pressure.

8. A pipe end insert comprising a rigid annular supporting structure, an elongated tubular sleeve of elastic deformable material having a trailing end secured to said supporting structure and a leading end adapted to be inserted into a pipe end, the leading end of the sleeve being adapted to communicate with the interior of the pipe so that the sleeve is radially expandable by fluid pressure in the pipe, and an elongated radially expansible sheath completely encompassing said sleeve throughout a major portion of the length of the sleeve and comprising a multiplicity of elongated flexible gripping elements which extend generally longitudinally of the sheath and are secured at one end to said supporting structure and are secured at the other end to said sleeve intermediate the ends of the sleeve, said gripping elements being formed and arranged to be forced radially outward into frictional gripping engagement with the inner surface of an enclosing pipe upon expansion of the sleeve, and the sleeve extending axially beyond the sheath in the direction away from said supporting structure and having adjacent its leading end means providing a sealing structure which in the unconfined condition of the sleeve has an over-all cross-sectional area at least equal to that of the inside of the pipe into which it is to be inserted so as to form when so inserted a sealing lip operative to provide an initial strong fluid-tight seal with the inner surface of the pipe independent of internal pressure.

9. A pipe end insert as claimed in claim 8, said sealing structure consisting in that said axial extension of the sleeve flares outwardly in the undeformed position of the sleeve.

10. A pipe end insert as claimed in claim 8, said elongated flexible gripping elements being strips, one edge of which is secured to the sleeve and the other edge of which is radially outwardly exposed.

11. A pipe end insert as claimed in claim 10, said strips being radially inwardly concave.

12. A pipe end insert as claimed in claim 8, said flexible gripping elements comprising elongated strips that are radially inwardly concave.

13. A pipe end insert as claimed in claim 8, said flexible gripping elements converging toward each other at least adjacent the ends thereof remote from said rigid annular supporting structure in the undeformed position of the sleeve.

14. A pipe end insert as claimed in claim 8, said sealing structure having a substantially larger cross-sectional area than the periphery of the sheath at the adjacent ends of said flexible gripping elements when the sleeve is in its undeformed position.

References Cited

UNITED STATES PATENTS

| | | | |
|---|---|---|---|
| 188,446 | 3/1877 | Wakeman | 138—127 |
| 1,808,162 | 6/1931 | Frantz | 285—107 X |
| 2,171,049 | 8/1939 | Simmons | 285—338 X |
| 2,299,116 | 10/1942 | Svirsky | 138—90 |
| 2,403,386 | 7/1946 | Lubelsky et al. | 220—24.5 X |
| 2,544,119 | 3/1951 | Wolfe | 138—138 |
| 2,585,509 | 2/1952 | Smith | 138—138 X |
| 3,063,303 | 11/1962 | Cadwallader | 138—126 X |

FOREIGN PATENTS

| | | |
|---|---|---|
| 16,793 | 1893 | Great Britain. |
| 536,228 | 11/1955 | Italy. |

LAVERNE D. GEIGER, *Primary Examiner.*

C. L. HOUCK, *Assistant Examiner.*